US008713950B2

(12) United States Patent
Roering

(10) Patent No.: US 8,713,950 B2
(45) Date of Patent: May 6, 2014

(54) METHOD OF OPERATING A COOLING SYSTEM AND COOLING SYSTEM

(75) Inventor: Sebastian Roering, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1022 days.

(21) Appl. No.: 12/718,631

(22) Filed: Mar. 5, 2010

(65) Prior Publication Data

US 2010/0251737 A1 Oct. 7, 2010

Related U.S. Application Data

(60) Provisional application No. 61/209,255, filed on Mar. 5, 2009.

(30) Foreign Application Priority Data

Mar. 5, 2009 (DE) .......................... 10 2009 011 797

(51) Int. Cl.
F25B 7/00 (2006.01)
(52) U.S. Cl.
USPC ........ 62/175; 62/79; 62/113; 62/217; 62/335; 62/DIG. 5
(58) Field of Classification Search
USPC ................. 62/79, 113, 175, 217, 335, DIG. 5
See application file for complete search history.

(56) References Cited

U.S. PATENT DOCUMENTS 4,285,206 A * 8/1981 Koser ................................ 62/126
4,457,138 A * 7/1984 Bowman ........................ 62/196.1
6,240,738 B1 * 6/2001 Kato et al. ....................... 62/239
2009/0044563 A1 * 2/2009 Heckt et al. ...................... 62/503
2009/0193820 A1 8/2009 Fotiadis et al.

FOREIGN PATENT DOCUMENTS

| DE | 4340316 | 6/1995 |
| DE | 102006005035 | 9/2007 |
| DE | 102006040380 | 3/2008 |
| FR | 2735852 | 12/1996 |
| WO | WO 2007088012 B1 * | 8/2007 |

OTHER PUBLICATIONS

DE102006040380 English Language Abstract, Mar. 6, 2008, BSH Bosch Siemens.

(Continued)

Primary Examiner — Allana Lewin
Assistant Examiner — Jonathan Bradford
(74) Attorney, Agent, or Firm — Krieg DeVault, LLP

(57) ABSTRACT

In a method of the application, cooling energy is produced by a refrigerating device. The cooling energy produced by the refrigerating device is supplied to at least one cooling station by a cooling circuit, circulating in which is a refrigerant, which upon release of its cooling energy to the at least one cooling station is converted from the liquid to the gaseous state and is then converted back to the liquid state by corresponding pressure- and temperature control in the cooling circuit. Upon transfer of the cooling system to its state of rest, a control value disposed in the cooling circuit is controlled in such a way that a desired operating pressure ($p_B$) arises in the cooling circuit downstream of the control valve. Refrigerant cooled by the refrigerating device is received in a reservoir disposed upstream of the control valve in the cooling circuit.

13 Claims, 3 Drawing Sheets

(56) References Cited

OTHER PUBLICATIONS

Figure 1:
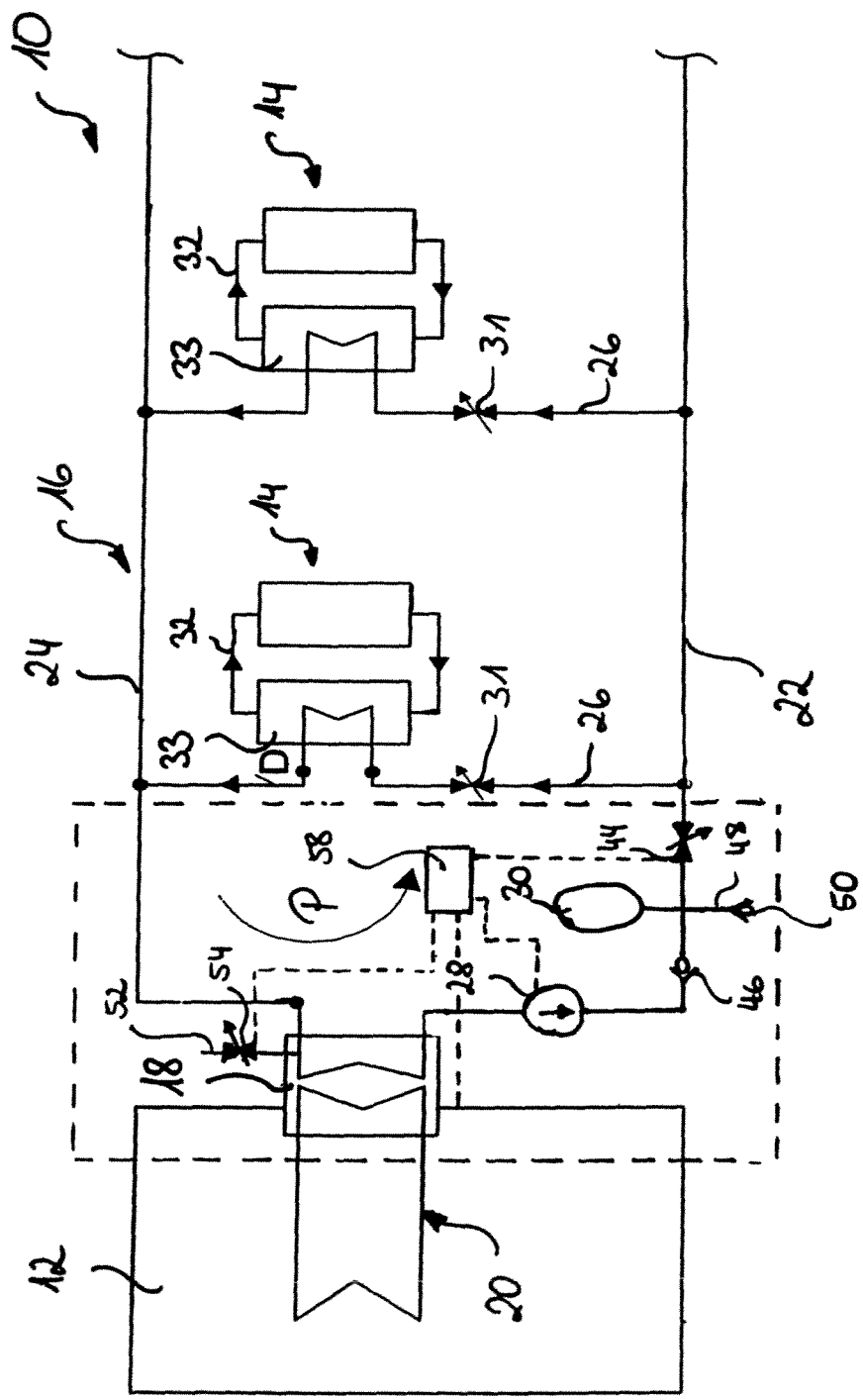

DE102006005035 English Language Abstract, Sep. 27, 2007, Airbus GmbH.

DE4340316 English Language Abstract, Jun. 1, 1995, Deutsche Aerospace Airbus.

FR2735852 English Language Abstract, Dec. 27, 1996, Electro Calorique.

* cited by examiner

METHOD OF OPERATING A COOLING SYSTEM AND COOLING SYSTEM

CROSS REFERENCE TO RELATED APPLICATIONS

The present application claims priority to German Patent Application No. 10 2009 011 797.0 filed Mar. 5, 2009. and claims the benefit of U.S. Provisional Patent Application No. 61/209,255, filed Mar. 5, 2009, each of which is incorporated herein by reference.

The invention relates to a method of operating a cooling system that is suitable in particular for cooling food on board an aircraft, wherein cooling energy is produced by means of a refrigerating device and supplied to at least one cooling station by means of a cooling circuit. Circulating in the cooling circuit is a refrigerant, which upon release of its cooling energy to the at least one cooling station is converted from the liquid to the gaseous state and is then converted back to the liquid state by means of corresponding pressure- and temperature control in the cooling circuit. The invention further relates to a cooling system suitable for such operation.

A cooling system suitable for operation with a two-phase refrigerant is known from DE 10 2006 005 035 B3 and is used for example to cool food that is stored on board a passenger aircraft and intended to be issued to the passengers. Typically, the food provided for supplying to the passengers is kept in mobile transport containers. These transport containers are filled and precooled outside the aircraft and after loading into the aircraft are deposited at appropriate locations in the aircraft passenger cabin, for example in the galleys. In order to guarantee that the food remains fresh up to being issued to the passengers, in the region of the transport container locations cooling stations are provided, which are supplied with cooling energy from a central refrigerating device and release this cooling energy to the transport containers, in which the food is stored. A cooling system with a central refrigerating device, as opposed to refrigerating units formed separately at the individual transport container locations, has the advantages of a lower installation volume and a lower weight and moreover entails less outlay for assembly and maintenance. Furthermore, by using a cooling system with a central refrigerating device disposed outside of the passenger cabin it is possible to avoid machine noises generated by refrigerating units disposed in the region of the transport container locations, which noises are audible in the aircraft passenger cabin and hence may be found intrusive.

In the cooling system known from DE 10 2006 005 035 B3, the phase transitions of the refrigerant flowing through the circuit that occur during operation of the system allow the latent heat consumption that then occurs to be utilized for cooling purposes. The refrigerant mass flow needed to provide a desired cooling capacity is therefore markedly lower than for example in a liquid cooling system, in which a onephase liquid refrigerant is used. Consequently, the cooling system described in DE 10 2006 005 035 B3 may have lower line cross sections than a liquid cooling system with a comparable cooling capacity. What is more, the reduction of the refrigerant mass flow makes it possible to reduce the conveying capacity needed to convey the refrigerant through the cooling circuit of the cooling system. This leads to an increased efficiency of the system because less energy is needed to operate a corresponding conveying device, such as for example a pump, and moreover less additional heat generated by the conveying device during operation of the conveying device has to be removed from the cooling system.

A problem that is posed by the cooling system disclosed in DE 10 2006 005 035 B3 is however the high rest pressure of the refrigerant that may arise in the state of rest of the system if the refrigerant in the state of rest of the system is in the gaseous state. Whereas the rest pressure of the refrigerant in a liquid cooling system, in which for example Galden® is used as a refrigerant, is usually at most ca. 20 bar, in a cooling system designed for two-phase operation, in which for example $CO_2$ is used as a refrigerant, pressures of 170 to 220 bar may arise at a system temperature of ca. 85° C. Consequently, the line system of the cooling system is exposed to considerable loads and has to be designed accordingly. This leads to an increase of the weight of the lines, which has adverse repercussions particularly in the case of use of the cooling system on board an aircraft. Furthermore, a cooling system having high pressures prevailing in its cooling circuit has an increased susceptibility to leakages. Finally, maintaining such a system takes more time and hence entails greater costs.

The underlying object of the invention is to provide a method of operating a cooling system that enables a weight-optimized and, from a safety viewpoint, improved design of a cooling system, which is designed for operation with a two-phase refrigerant and is suitable in particular for cooling food on board an aircraft. An underlying object of the invention is moreover to indicate a weight-optimized and, from a safety viewpoint, improved cooling system that is designed for operation with a two-phase refrigerant and is suitable in particular for cooling food on board an aircraft.

This object is achieved by a method of operating a cooling system having the features of claim 1 and by a cooling system having the features of claim 7.

In the method according to the invention of operating a cooling system, cooling energy is produced by means of a refrigerating device. The cooling energy produced by the refrigerating device is supplied to at least one cooling station by means of a cooling circuit. Circulating in the cooling circuit is a refrigerant, which upon release of its cooling energy to the at least one cooling station is converted from the liquid to the gaseous state and is then converted back to the liquid state by means of corresponding pressure- and temperature control in the cooling circuit. As a refrigerant it is possible to use for example $CO_2$ or R134A ($CH_2F$—$CF_3$).

The cooling circuit of the cooling system may be connected to only one cooling station disposed for example in the region of a galley in a passenger cabin of an aircraft. The cooling circuit may however also be devised to supply cooling energy produced by the refrigerating device to a plurality of cooling stations, which may be arranged distributed in the passenger cabin of the aircraft. In the latter case, the cooling circuit then preferably comprises a feed line, through which a refrigerant cooled by a central refrigerating device to the required temperature may be conveyed in the direction of the individual cooling stations, as well as a discharge line, through which the refrigerant heated by the cooling energy transfer to the cooling stations may be conveyed back in the direction of the central refrigerating device. The individual cooling stations may be connected for example by corresponding branch lines to the feed- and/or the discharge line of the first cooling circuit.

The refrigerating device may be coupled directly to the cooling circuit. Preferably however there is merely a thermal coupling between the refrigerating device and the cooling circuit, which may be realized for example by means of a heat exchanger. In this way it is possible to prevent the line system of the cooling circuit from being loaded with the occasionally very high pressure prevailing in the refrigerating device. The heat exchanger may take the form of a condenser so that the refrigerant circulating in the cooling circuit, as it flows through the heat exchanger, is converted from the gaseous to the liquid state.

In the operating method according to the invention, upon transfer of the cooling system to its state of rest a control valve disposed in the cooling circuit is controlled in such a way that a desired operating pressure arises in the cooling circuit downstream of the control valve. Refrigerant cooled by the refrigerating device is received in a reservoir disposed upstream of the control valve in the cooling circuit. In the context of this application the terms "downstream" and "upstream" relate in each case to the direction of flow of the refrigerant through the cooling circuit. As a control valve a valve with a variable flow cross section, such as for example a solenoid valve or the like, may be used. The reservoir is disposed preferably in a region of the cooling circuit lying upstream of a cooling circuit region, in which the cooling circuit for transferring the cooling energy produced by the refrigerating device to the refrigerant flowing through the cooling circuit is coupled either directly or merely thermally to the refrigerating device.

The operating method according to the invention is able effectively to prevent a region of the cooling circuit lying downstream of the control valve, i.e. the lines and other components, such as for example valves, heat exchangers etc., provided in this region of the cooling circuit, from being loaded in the state of rest of the cooling system with the high maximum rest pressure of the two-phase refrigerant that arises if the refrigerant is in the gaseous state. Instead, the region of the cooling circuit lying downstream of the control valve may be kept under a comparatively low operating pressure.

The loads, to which the line system and the further components of the cooling circuit region lying downstream of the control valve are exposed in the state of rest of the cooling system, may therefore be markedly reduced by the operating method according to the invention. A design of the cooling circuit that is adapted to the reduced loads therefore allows weight- and volume reductions that, particularly in the case of use of the cooling system according to the invention on board an aircraft, have a positive effect and lead to lower manufacturing- and operating costs. A cooling system operated by the method according to the invention is moreover, owing to the reduced pressure prevailing in wide regions of the cooling circuit in the state of rest of the cooling system, notable for enhanced safety of operation and a reduced susceptibility to leakages. Finally, the operating method according to the invention allows a simplification of assembly- and maintenance tasks.

The operation of the refrigerating device in the method according to the invention of operating a cooling system is preferably controlled in such a way that a desired fraction of the refrigerant upon being received in the reservoir is in the liquid state. The fraction of the refrigerant that is in the liquid state upon being received in the reservoir is preferably as high as possible and is ideally 100%. By converting the refrigerant to the liquid state it is advantageously possible to minimize the pressure, to which the reservoir is exposed in the state of rest of the cooling system. However, in order to ensure that the system may be maintained even at ambient temperatures of ca. 85° C. in the state of rest, the reservoir is preferably designed so as to be capable of withstanding the maximum rest pressure of the refrigerant that arises when the refrigerant is in the gaseous state.

The operation of the refrigerating device may be controlled in such a way that at least temporarily more cooling energy is supplied to the refrigerant during transfer of the cooling system to its state of rest than during normal operation of the cooling system. The quantity of cooling energy supplied to the refrigerant may be controlled as a function of various parameters. These parameters may include for example the fraction of refrigerant that is to be in the liquid state upon receiving of the refrigerant in the reservoir as well as the heat content of the refrigerant prior to supply of the cooling energy. An increased supply of cooling energy to the refrigerant circulating in the cooling circuit may be realized for example by lowering the operating temperature of the heat exchanger that is used to couple the refrigerating device thermally to the cooling circuit.

In a preferred embodiment of the method according to the invention of operating a cooling system, the backflow of refrigerant from the reservoir to a region of the cooling circuit lying upstream of the reservoir is prevented by means of a valve, for example a non-return valve, which is disposed upstream of the reservoir in the cooling circuit. The valve, for example in the form of a non-return valve, and the control valve therefore delimit a region of the cooling circuit that has to be designed for the maximum rest pressure of the refrigerant, whereas all of the regions of the cooling circuit situated outside of this region need merely be designed to withstand the operating pressure of the system.

In the operating method according to the invention, upon transfer of the cooling system to its state of rest the desired operating pressure is set in the cooling circuit region lying downstream of the control valve by means of a corresponding control of the control valve that effects for example the closing of the control valve. The refrigerating device and/or a conveying device for conveying the refrigerant through the cooling circuit, on the other hand, even after closing of the control valve preferably continue(s) to be operated in order to cool refrigerant from the cooling circuit region lying downstream of the control valve by supplying cooling energy from the refrigerating device and/or in order to convey this refrigerant into the reservoir. For example, the conveying device and/or the refrigerating device may be switched off only upon the achievement of a desired refrigerant level in the reservoir and/or a desired refrigerant pressure/refrigerant temperature ratio in a heat exchanger in the form of a condenser, which is devised to transfer the cooling energy produced by the refrigerating device to the refrigerant circulating in the cooling circuit. The refrigerant level, the refrigerant pressure and the refrigerant temperature may be measured by suitable sensors.

Where desirable or necessary for example after assembly- or maintenance tasks, the cooling circuit in the state of rest of the cooling system may be filled with refrigerant through a filling line connected to the reservoir. In the filling line a valve, for example in the form of a non-return valve, may be disposed in order to prevent an undesirable backflow of refrigerant from the reservoir into the filling line. Through the filling line the cooling circuit of the cooling system may be filled with refrigerant without a previous evacuation of the cooling circuit being necessary.

If during normal operation of the cooling system or during the transfer of the cooling system to its state of rest it is detected that there is an air entrapment in the cooling system, for example in the line system or some other component of the cooling circuit, the cooling system may be vented by means of corresponding control of a vent valve disposed in a vent line. The vent valve may be for example a solenoid valve with a variable flow cross section and may be controlled manually or automatically. The vent line may be connected for example to an under-cooled region of the heat exchanger that is used to transfer the cooling energy produced by the refrigerating device to the refrigerant circulating in the cooling circuit. In this way it may be guaranteed that only air, but not the refrigerant, exits from the cooling circuit. In order to detect an air entrapment in the cooling system, a correlation between the dew-point temperature and the dew-point pressure of the refrigerant circulating in the cooling circuit may for example be monitored. If the correlation between the dew-point temperature and the dew-point pressure of the refrigerant circulating in the cooling circuit lies outside of a normal range, this is evaluated as an indication of the presence of an air entrapment in the cooling system and venting of the system is initiated.

A cooling system according to the invention, which is suitable in particular for cooling food on board an aircraft, comprises a refrigerating device as well as a cooling circuit that is devised to supply cooling energy produced by the refrigerating device to at least one cooling station, wherein a refrigerant circulating in the cooling circuit is so selected that upon release of its cooling energy to the at least one cooling station it is convertible from the liquid to the gaseous state and is then convertible back to the liquid state by means of corresponding pressure- and temperature control in the cooling circuit. As a refrigerant, $CO_2$ or R134A ($CH_2F-CF_3$) for example may be used.

The cooling system according to the invention comprises a control unit that is devised, upon transfer of the cooling system to its state of rest, to control a control valve disposed in the cooling circuit in such a way that a desired operating pressure arises in the cooling circuit downstream of the control valve. The control unit may for example take the form of an electronic control unit and for control of the control valve may utilize signals that are supplied to the control unit by a pressure sensor for measuring the refrigerant pressure in a cooling circuit region lying downstream of the control valve. The cooling system according to the invention further comprises a reservoir, which is disposed upstream of the control valve in the cooling circuit and is devised to receive refrigerant cooled by the refrigerating device.

In the cooling system according to the invention, the line system as well as the further components of the cooling circuit region lying downstream of the control valve are exposed merely to the desired operating pressure adjusted by means of the corresponding control of the control valve. It is therefore possible to dispense with designing these cooling system elements in such a way that they are able to withstand the maximum rest pressure of the refrigerant. It is thereby possible to achieve reductions of weight and volume, with the result that the cooling system is eminently suitable for use on board an aircraft. The cooling system according to the invention is moreover notable for enhanced safety of operation and a reduced susceptibility to leakages. Finally, the cooling system is relatively easy to assemble and maintain.

The control unit is preferably devised to control the operation of the refrigerating device in such a way that a desired fraction of the refrigerant upon being received in the reservoir is in the liquid state. The desired fraction of the refrigerant that is in the liquid state upon receiving of the refrigerant in the reservoir is preferably as high as possible and is ideally 100%.

The control unit may further be devised to control the operation of the refrigerating device in such a way that at least temporarily more cooling energy is supplied to the refrigerant during the transfer of the cooling system to its state of rest than during normal operation of the cooling system.

The cooling system according to the invention may further comprise a valve, for example in the form of a non-return valve, which is disposed upstream of the reservoir in the cooling circuit and is devised to prevent the backflow of refrigerant from the reservoir into a region of the cooling circuit lying upstream of the reservoir.

The control unit of the cooling system according to the invention may further be devised to switch off a conveying device for conveying the refrigerant through the cooling circuit and/or the refrigerating device upon achievement of a desired refrigerant level in the reservoir and/or a desired refrigerant pressure/refrigerant temperature ratio in a heat exchanger in the form of a condenser, which is devised to transfer the cooling energy produced by the refrigerating device to the refrigerant circulating in the cooling circuit. The refrigerant level, the refrigerant pressure and the refrigerant temperature may be measured by suitable sensors.

The cooling system may further comprise a filling line, which is connected to the reservoir and through which the cooling circuit may be filled with refrigerant in the state of rest of the cooling system. In the filling line a valve, for example in the form of a non-return valve, may be disposed.

The control unit of the cooling system according to the invention may further be devised to control a vent valve disposed in a vent line in such a way that the cooling system is vented if during operation of the cooling system an air entrapment is detected. In order to detect an air entrapment, the control unit may monitor a correlation between the dew-point temperature and the dew-point pressure of the refrigerant circulating in the cooling circuit and initiate venting of the system if this correlation lies outside of a normal range.

The vent line may be connected to an under-cooled region of a heat exchanger in the form of a condenser, which is devised to transfer the cooling energy produced by the refrigerating device to the refrigerant circulating in the cooling circuit.

The cooling system according to the invention is eminently suitable for use in an aircraft, in particular for cooling food on board the aircraft.

Figure 2:
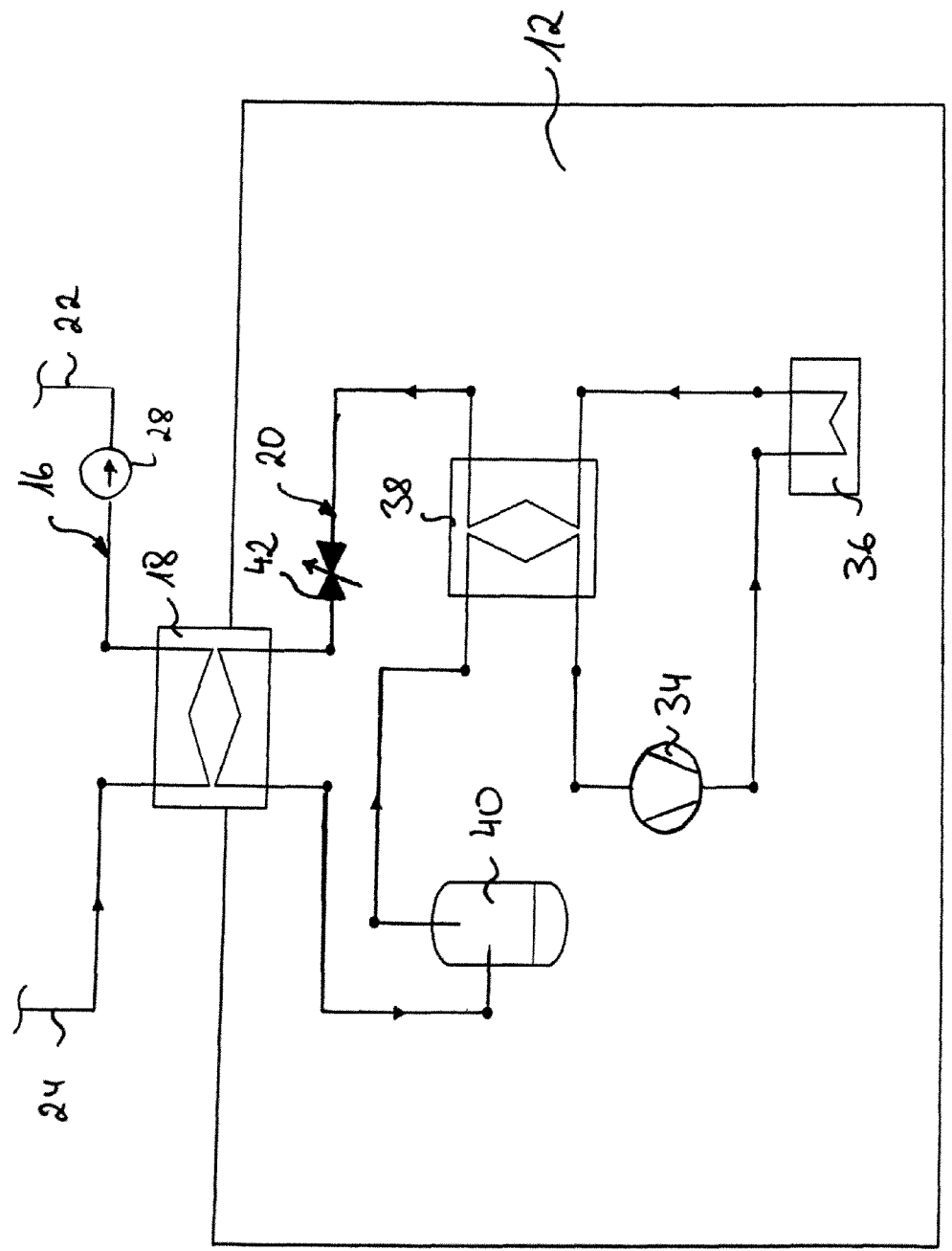
Figure 3:
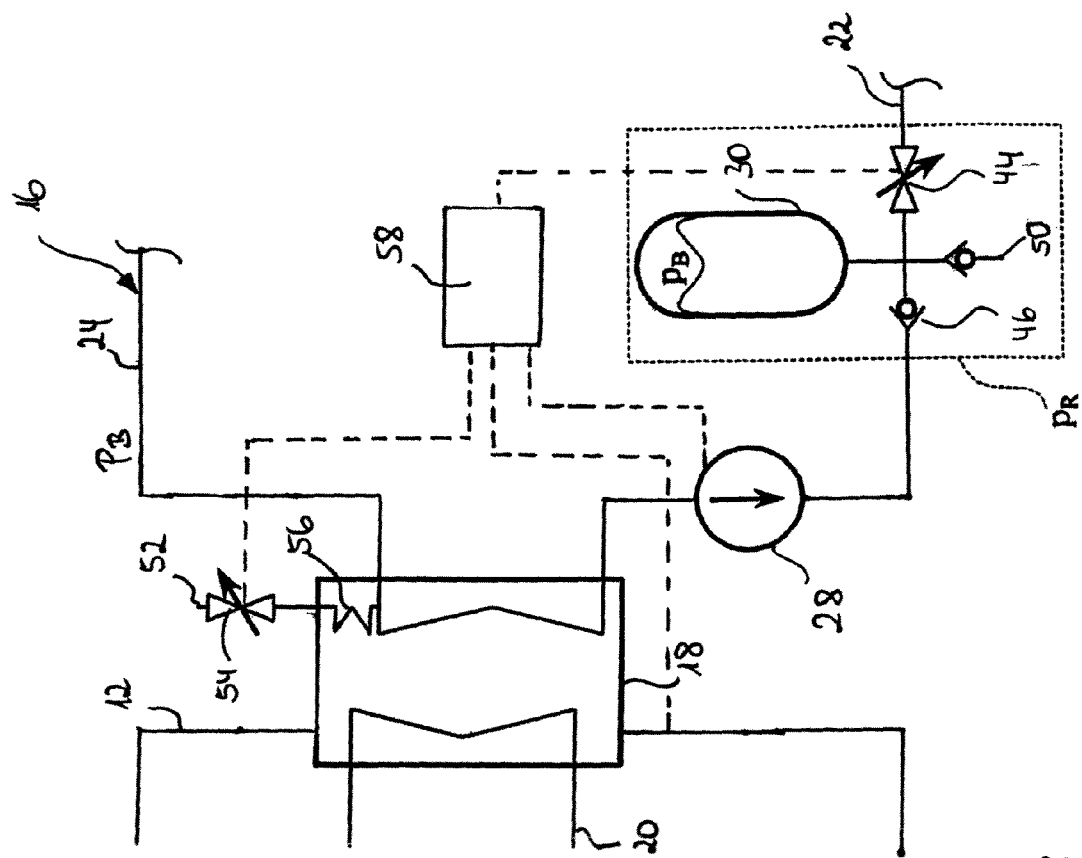

There now follows a detailed description of a preferred embodiment of the invention with reference to the accompanying diagrammatic drawings, which show:

FIG. 1 a cooling system according to the invention,

FIG. 2 an enlarged representation of a refrigerating device used in the cooling system according to the invention of FIG. 1 and FIG. 3 an enlarged representation of the region of the cooling system according to the invention that is outlined in FIG. 1.

FIG. 1 shows a cooling system 10, which is provided for cooling food that is provided on board a passenger aircraft for issuing to the passengers and is stored in mobile transport containers. The cooling system 10 comprises a central refrigerating device 12 as well as a plurality of cooling stations 14, which are arranged distributed in the region of the galleys at respective locations of the transport containers in the passenger cabin of the aircraft. For supplying the cooling stations 14 with cooling energy a cooling circuit 16 is provided, through which a refrigerant flows in an anticlockwise direction, as indicated by the arrow P. As a refrigerant $CO_2$ is used in the cooling circuit 16.

The cooling circuit 16 of the cooling system 10 is thermally coupled by a heat exchanger 18 in the form of a condenser to a further cooling circuit 20 of the refrigerating device 12. Otherwise, the cooling circuit 16 of the cooling system 10 and the further cooling circuit 20 of the refrigerating device 12 are formed separately from one another, so that the cooling circuit 16 of the cooling system 10 during operation of the cooling system 10 is not loaded with the occasionally very high pressure prevailing in the further cooling circuit 20 of the refrigerating device 12.

The cooling circuit 16 comprises a feed line 22, a discharge line 24 as well as a plurality of branch lines 26, wherein the branch lines 26 are used to connect the individual cooling stations 14 to the feed- and/or discharge line 22, 24 of the cooling circuit 16. A conveying device 28 in the form of a pump is disposed in the feed line 22 of the cooling circuit 16 and is used to convey the refrigerant from a region of the cooling circuit 16 lying upstream of the conveying device 28 into a reservoir 30 disposed downstream of the conveying device 28 in the cooling circuit 16. The reservoir 30 is provided with suitable insulation so that the refrigerant temporarily stored in the reservoir 30 may be kept at a desired low temperature.

In each branch line 26 connecting the feed line 22 of the cooling circuit 16 to the individual cooling stations 14 a throttle value 31 is disposed, which is used to control the flow rate of the refrigerant in the direction of each cooling station 14 as well as the pressure of the refrigerant upstream of each cooling station 14. Each throttle value 31, where necessary, is capable of completely interrupting the flow of refrigerant through the corresponding branch line 26 and hence stopping the supply of refrigerant to the cooling station 14 disposed downstream of the throttle value 31. In this way, individual cooling stations 14 may easily be uncoupled from the cooling circuit 16, while other cooling stations 14 continue to be supplied with cooling energy.

Each cooling station 14 has a cooling circuit 32, which is formed separately from the cooling circuit 16 and is coupled thermally to the cooling circuit 16 by a heat exchanger 33. The heat exchanger 33 takes the form of an evaporation device so that the refrigerant flowing through the cooling circuit 16 upon release of its cooling energy to the cooling station 14 is converted from the liquid to the gaseous state. After leaving the heat exchanger 33 the refrigerant is converted back to the liquid state by means of corresponding temperature- and pressure control in the cooling circuit 16.

As is evident from FIG. 2, in the further cooling circuit 20 of the refrigerating device 12 a further conveying device 34 in the form of a compressor is disposed, which is used to circulate a further refrigerant in the further cooling circuit 20. As a further refrigerant $CO_2$ is used. Downstream of the further conveying device 34 a cooling apparatus 36 in the form of a gas cooling apparatus is disposed in the further cooling circuit 20 of the refrigerating device 12. The cooling apparatus 36, in which ambient ram air is used as a heat sink, is used to cool the further refrigerant circulating in the further cooling circuit 20 to the required low temperature.

In the further cooling circuit 20 of the refrigerating device 12 a further heat exchanger 38 is moreover disposed. The further heat exchanger 38 effects a thermal coupling of a portion of the further cooling circuit 20 extending upstream of the further conveying device 34 to a portion of the further cooling circuit 20 extending downstream of the cooling apparatus 36. The effect achieved by disposing the further heat exchanger 38 in the further cooling circuit 20 is that the refrigerant, which is heated in the heat exchanger 18 as a result of the transfer of cooling energy from the further cooling circuit 20 to the cooling circuit 16, before entering the further conveying device 34 and the cooling apparatus 36 first flows through the further heat exchanger 38. As it passes through the further heat exchanger 38 the further refrigerant, which flows through the portion of the further cooling circuit 20 extending upstream of the further conveying device 34, absorbs heat and therefore experiences a temperature rise. This ensures that the $CO_2$ used as a further refrigerant is supplied in the gaseous state to the further conveying device 34 in the form of a compressor.

As may best be seen from FIG. 3, the cooling system 10 further comprises a control valve 44, which is disposed downstream of the reservoir 30 in the cooling circuit 16. Upstream of the reservoir 30 a non-return valve 46 is provided in the cooling circuit 16. A filling line 48 connected to the reservoir 30 is used, for example after maintenance tasks, to feed refrigerant into the cooling circuit 16. In the filling line 48 a further non-return valve 50 is disposed.

The further cooling circuit 20 of the refrigerating device 12 comprises a further reservoir 40 for buffering of the further refrigerant as well as a throttle valve 42.

The cooling system 10 further comprises a vent line 52 as well as a vent valve 54 disposed in the vent line 52. The vent line 52 is connected to an under-cooled region 56 of the heat exchanger 18 in the form of a condenser. The vent valve 54, like the conveying device 28, the control valve 44 and the refrigerating device 12, is conis trolled by means of an electronic control unit 58. The electronic control unit 58 may be connected to various sensors for acquiring the operating state of the cooling system 10, such as for example pressure- and temperature sensors, which are not represented in the figures, and may use the signals emitted by these sensors to control the conveying device 28, the vent valve 54, the control valve 44 and the refrigerating device 12.

When the cooling system 10 is to be transferred to its state of rest, the electronic control unit 58 controls the control valve 44 in such a way that a desired operating pressure $p_B$ arises in the cooling circuit 16 downstream of the control valve 44. This may be achieved for example by closing the control valve 44. The conveying device 28 and the refrigerating device 12 however initially continue to be operated even after closing of the control valve 44. As a result, refrigerant from the region of the cooling circuit 16 lying downstream of the control valve 44 is initially fed to the heat exchanger 18.

The electronic control unit 58 controls the refrigerating device 12 in such a way that the refrigerant, as it flows through the heat exchanger, is converted substantially completely to the liquid state. For this purpose the electronic control unit 58 may, if necessary, also control the refrigerating device 12 in such a way that at least temporarily more cooling energy is supplied to the refrigerant during transfer of the cooling system 10 to its state of rest than during normal operation of the cooling system 10. The conveying device 28 then conveys the liquid refrigerant into the reservoir 30, wherein a backflow of the refrigerant from the reservoir 30 into a region of the cooling circuit 16 lying upstream of the reservoir 30 is prevented by means of the non-return valve 46.

The refrigerating device 12 and the conveying device 28 are operated until a desired refrigerant level and/or a desired refrigerant pressure is achieved in the reservoir 30. For example, the refrigerant pressure in the reservoir may equal the operating pressure $p_B$ that is adjusted by means of the control valve 44 also in the region of the cooling circuit 16 lying downstream of the control valve 44. Thus, in the state of rest of the cooling system 10 only the region of the cooling circuit 16 delimited by the non-return valve 46 and the control valve 44 may be loaded with the maximum rest pressure $p_R$ of the refrigerant that arises when the refrigerant is completely in the gaseous state. The components of the cooling circuit 16 disposed outside of this region, on the other hand, are loaded merely with the operating pressure $p_B$. It is therefore possible for these components to be of a simpler and hence lighter design. Furthermore, owing to the reduced pressure prevailing in wide regions of the cooling circuit 16 in the state of rest of the cooling system 10, the cooling system 10 is notable for enhanced safety of operation and a lower susceptibility to leakages.

Through the feed line 48 the cooling circuit 16 of the cooling system 10 may, for example after maintenance tasks, be filled with refrigerant without a previous evacuation of the cooling circuit 16 being necessary for this purpose. This facilitates the maintenance and re-starting of the cooling system 10.

Finally, the electronic control unit 58 by processing corresponding sensor signals monitors a correlation between the dew-point temperature and the dew-point pressure of the refrigerant in the cooling circuit 16. If this correlation lies outside of a defined normal range, the electronic control unit 58 evaluates this as an indication that there is an air entrapment in the cooling system 10. In response to the detection of an air entrapment in the cooling system 10, the electronic control unit 58 triggers the vent valve 54, with the result that the vent valve 54 may be opened and the cooling circuit 16 may be vented.

The invention claimed is:

1. A method of operating a cooling system comprising the steps:
producing cooling energy by means of a refrigerating device and
supplying the cooling energy produced by the refrigerating device to at least one cooling station by means of a cooling circuit, circulating in which is a refrigerant, which upon release of the cooling energy of the refrigerant to the at least one cooling station the refrigerant is converted from the liquid to the gaseous state and is then converted back to the liquid state by means of corresponding pressure and temperature control in the cooling circuit,
wherein upon transfer of the cooling system to its state of rest a control valve disposed in the cooling circuit is controlled in such a way that a desired operating pressure ($p_B$) arises in the cooling circuit downstream of the control valve and that refrigerant cooled by the refrigerating device is received in a reservoir disposed upstream of the control valve in the cooling circuit.

2. The method according to claim 1, wherein the operation of the refrigerating device is controlled in such a way that a desired fraction of the refrigerant upon being received in the reservoir is in the liquid state.

3. The method according to claim 1, wherein the backflow of refrigerant from the reservoir into a region of the cooling circuit lying upstream of the reservoir is prevented by means of a valve disposed upstream of the reservoir in the cooling circuit.

4. The method according to claim 1, wherein a conveying device for conveying the refrigerant through the cooling circuit and/or the refrigerating device is/are switched off upon achievement of a desired refrigerant level in the reservoir and/or a desired refrigerant pressure/refrigerant temperature ratio in a heat exchanger in the form of a condenser, which is devised to transfer the cooling energy produced by the refrigerating device to the refrigerant circulating in the cooling circuit.

5. The method according to claim 1, wherein the cooling circuit is filled with refrigerant in the state of rest of the cooling system through a filling line connected to the reservoir.

6. Method according to claim 1, wherein the cooling system is vented by corresponding control of a vent valve disposed in a vent line if an air entrapment is detected during operation of the cooling system.

7. A cooling system comprising:
a refrigerating device and
a cooling circuit, which is devised to supply cooling energy produced by the refrigerating device to at least one cooling station,
wherein a refrigerant circulating in the cooling circuit is so selected that upon release of the cooling energy of the refrigerant to the at least one cooling station the refrigerant is convertible from the liquid to the gaseous state and is then convertible back to the liquid state by means of corresponding pressure- and temperature control in the cooling circuit,
wherein a control unit is devised upon transfer of the cooling system to its state of rest to control a control valve disposed in the cooling circuit in such a way that a desired operating pressure ($p_B$) arises in the cooling circuit downstream of the control valve, and a reservoir disposed upstream of the control valve in the cooling circuit is devised to receive refrigerant cooled by the refrigerating device.

8. The cooling system according to claim 7, wherein the control unit is devised to control the operation of the refrigerating device in such a way that a desired fraction of the refrigerant upon being received in the reservoir is in the liquid state.

9. The cooling system according to claim 7, wherein a valve, which is disposed upstream of the reservoir in the cooling circuit and is devised to prevent the backflow of refrigerant from the reservoir into a region of the cooling circuit lying upstream of the reservoir.

10. The cooling system according to claim 7, wherein the control unit is devised to switch off a conveying device for conveying the refrigerant through the cooling circuit and/or the refrigerating device upon achievement of a desired refrigerant level in the reservoir and/or a desired refrigerant pressure/refrigerant temperature ratio in a heat exchanger in the form of a condenser, which is devised to transfer the cooling energy produced by the refrigerating device to the refrigerant circulating in the cooling circuit.

11. The cooling system according to claim 7, characterized by a filling line, which is connected to the reservoir and through which the cooling circuit is fillable with refrigerant in the state of rest of the cooling system.

12. The cooling system according to claim 7, wherein the control unit is devised to control a vent valve disposed in a vent line in such a way that the cooling system is vented if an air entrapment is detected during operation of the cooling system.

13. The cooling system according to claim 12, wherein the vent line is connected to an under-cooled region of a heat exchanger in the form of a condenser, which is devised to transfer the cooling energy produced by the refrigerating device to the refrigerant circulating in the cooling circuit.

* * * * *